(12) United States Patent
Tomoto et al.

(10) Patent No.: US 8,133,046 B2
(45) Date of Patent: Mar. 13, 2012

(54) CENTER MECHANISM OF TIRE VULCANIZING MACHINE

(75) Inventors: Keiichi Tomoto, Hiroshima (JP);
Yoshikatsu Hineno, Hiroshima (JP);
Toshifumi Murakami, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 176 days.

(21) Appl. No.: 12/559,655

(22) Filed: Sep. 15, 2009

(65) Prior Publication Data
US 2010/0260877 A1    Oct. 14, 2010

(30) Foreign Application Priority Data
Apr. 10, 2009    (JP) .................................. 2009-095613

(51) Int. Cl.
*B29C 35/02*    (2006.01)
(52) U.S. Cl. ........................................... 425/48; 425/52
(58) Field of Classification Search .................... 425/43, 425/48, 52, 58
See application file for complete search history.

(56) References Cited

U.S. PATENT DOCUMENTS

| | | |
|---|---|---|
| 5,106,280 A | 4/1992 | Sakaguchi |
| 5,149,545 A | 9/1992 | Sakaguchi et al. |
| 5,601,850 A * | 2/1997 | Ureshino ........................ 425/48 |
| 6,416,305 B1 * | 7/2002 | Singh .............................. 425/48 |
| 7,513,763 B1 * | 4/2009 | Singh et al. ..................... 425/48 |

FOREIGN PATENT DOCUMENTS

| | | |
|---|---|---|
| DE | 4024435 A1 | 2/1991 |
| JP | 6-37058 | 5/1994 |
| JP | 10-076529 B2 | 3/1998 |
| WO | 0132388 A1 | 5/2001 |

OTHER PUBLICATIONS

European Search Report of corresponding Application No. 09 17 0220 mailed Jun. 30, 2010.
Korean Office Action from corresponding application No. 10-2009-92267 and its English Translation, May 16, 2011.

* cited by examiner

*Primary Examiner* — James Mackey
(74) *Attorney, Agent, or Firm* — Kanesaka Berner and Partners, LLP

(57) ABSTRACT

In a center mechanism of a tire vulcanizing machine, including an upper clamp ring for grasping an upper opening end part of a bladder, a lower clamp ring for grasping a lower opening end part of the bladder, a hub on a side of a lower mold for supporting the lower clamp ring, a spacer connected to the hub and supported on the side of the lower mold to be ascendable and descendable, and a center post supported by the spacer to be extensible and contractible, the hub and the spacer are formed as members separate from each other, and are divisibly bound to each other by bolts.

2 Claims, 5 Drawing Sheets

CENTER MECHANISM OF TIRE VULCANIZING MACHINE

RELATED APPLICATIONS

The present application is based on, and claims priority from, Japanese Application Number 2009-095613, filed Apr. 10, 2009, the disclosure of which is hereby incorporated by reference herein in its entirety.

TECHNICAL FIELD

This invention relates to a center mechanism of a tire vulcanizing machine used in a manufacturing process of a pneumatic tire which is mounted on an automobile or the like.

BACKGROUND ART

This type of center mechanism of a tire vulcanizing machine, as shown, for example, in FIG. 5, has hitherto been composed of a hub portion (lower ring portion) 100*a*, which a lower clamp ring for holding a lower part of a bladder (not shown) is screwed into and fixed to; a cylindrical spacer portion 100*b* connected to the hub portion 100*a* for raising and lowering the bladder and the lower clamp ring; and a guide tube 103 fixed to an inner peripheral part of a lower heating platen 102 on a base 101, the hub portion 100*a* and the spacer portion 100*b* being fitted in the guide tube 103 so as to be ascendable and descendable.

Heating and pressurizing media passages 104 are formed within the hub portion 100*a*, and a heating and pressurizing media supply pipe 105*a* and a heating and pressurizing media discharge pipe 105*b* are connected to the heating and pressurizing media passages 104 by screwing-in or the like. A circulation head 106 is bolted onto the upper surface of the hub portion 100*a*, and a nozzle hole (not shown) of the circulation head 106 is in communication with one of the above-mentioned heating and pressurizing media passage 104.

A bottom wall part of the spacer portion 100*b* is bolted to a flange 107, and a center post cylinder 108 is upwardly passed through and supported by the flange 107. A piston rod 108*a* of the center post cylinder 108 penetrates the above-mentioned hub portion 100*a* and circulation head 106 to be slidable in a vertical direction, and has a leading end to which an upper clamp ring for holding an upper part of the bladder (not shown) can be secured.

A piston rod leading end of a bead lift cylinder 109, which has been supported upwardly by a bracket (not shown) on the base 101, is fixed to the flange 107. By the extending and contracting action of the bead lift cylinder 109, the above-mentioned hub portion 100*a* and spacer portion 100*b* are allowed to ascend and descend together with the center post cylinder 108.

Before vulcanization of a tire, therefore, the descending action of the hub portion 100*a* and the spacer portion 100*b* by the retracting action of the bead lift cylinder 109 together with the center post cylinder 108 positions the hub portion 100*a* and the spacer portion 100*b* onto the lower mold, while the leading end of the piston rod 108*a* protruding above the hub portion 100*a* is retracted by the center post cylinder 108, whereby the bladder grasped by lower clamp ring and upper clamp ring is inserted along the inside surface of unvulcanized tire set on a lower mold (not shown).

In this state, a heating and pressurizing media are fed into the bladder from a heating and pressurizing media supply and discharge device (not shown) via the following route, heating and pressurizing media supply pipe 105*a*→heating and pressurizing media passage 104→nozzle hole of circulation head 106, whereby the tire is vulcanized at a high temperature close to 200° C.

SUMMARY OF INVENTION

Technical Problem

With the above-mentioned center mechanism, the hub portion 100*a* and the spacer portion 100*b* form an integrated structure, meaning that the hub portion 100*a* and the spacer portion 100*b* are formed as separate members, and then welded together. This has posed, for example, the following problems: (1) A plurality of steps, ranging from primary machining, welding and to finishing, are needed, and each step requires due care for precision and positioning. (2) Production by manufacturers other than those well-equipped with machining devices and welding machines incurs losses in manufacturing man-hours and transportation costs, and presents a cause for deterioration in quality. (3) If a weld defect is found after welding, it cannot be repaired. (4) Since heat during vulcanization is transmitted to the hub portion 100*a*, and then to the spacer portion 100*b*, heat radiation becomes so great that an energy loss occurs.

In recent years, therefore, there has been a center mechanism, as disclosed in Patent Document 1, in which a hub and a spacer are formed as separate members, and the spacer is screwed into and bound to the hub. With this center mechanism, the problems (1) to (3) mentioned above have been resolved, but the problem (4) of energy loss has remained unsolved, and the following problem has been involved: Because of the structure in which the spacer is screwed into the hub, mounting and dismounting operations for disassembly and repair, replacement, etc. of the hub are complicated, requiring enormous time and labor.

That is, with such a structure that a hub is rotated at the screw thread connection, it is impossible to helically rotate the hub alone, because the lower end parts of the heating and pressurizing media supply pipe and the heating and pressurizing media discharge pipe connected on the hub penetrate the bottom wall part of the spacer, etc. Thus, if the hub is to be dismounted, for example, the hub and the spacer in the interconnected state have to be once disassembled from the base (101) and, in this state, the heating and pressurizing media supply pipe and the heating and pressurizing media discharge pipe have to be detached, whereafter the hub must be helically rotated and removed from the spacer.

It is an object of the present invention, therefore, to provide a center mechanism of a tire vulcanizing machine, which can achieve a decrease in man-hours and an improvement in quality and easily permits commonality of components, disassembly and repair as well as replacement.

Solution to Problem

A first aspect of the present invention for attaining the above object is a center mechanism of a tire vulcanizing machine, including an upper clamp ring for holding an upper opening end part of a bladder, a lower clamp ring for holding a lower opening end part of the bladder, a hub on a lower mold side for supporting the lower clamp ring, a spacer connected to the hub and supported on the lower mold side to be ascendable and descendable, and a center post supported by the spacer to be extendable and retractable, wherein the hub and the spacer are formed as members separate from each other, and are divisibly bound to each other by bolts.

According to a second aspect of the present invention, a heat insulating material may be interposed between the hub and the spacer.

According to a third aspect of the present invention, whirl-prevention means may be provided between the hub and the spacer.

Advantageous Effects of Invention

According to the center mechanism of a tire vulcanizing machine concerned with the present invention, the center mechanism is of a segmented structure in which the hub and the spacer are formed as the separate members and bound together by the bolts. Thus, a decrease in the number of the processing steps and an improvement in the quality can be achieved, because of abolition of welding or the like strongly affecting the quality. Also, during the disassembly and repair, replacement, etc. of the hub due to wear or the like of the threaded portion upon mounting and dismounting of the lower clamp ring, when the hub is to be dismounted, for example, it suffices to loosen the bolts and pull out the hub upward. In comparison with the conventional structure requiring rotation of the hub at screw thread system, the dismounting operation is simplified, and enormous time and labor are unnecessary. For the mounting of the hub, only the reverse of the above-mentioned action is sufficient. The mounting operation is simplified, and enormous time and labor are unnecessary.

DESCRIPTION OF EMBODIMENTS

A center mechanism of a tire vulcanizing machine according to the present invention will now be described in detail by an embodiment with reference to the accompanying drawings.

Embodiment

Figure 1:
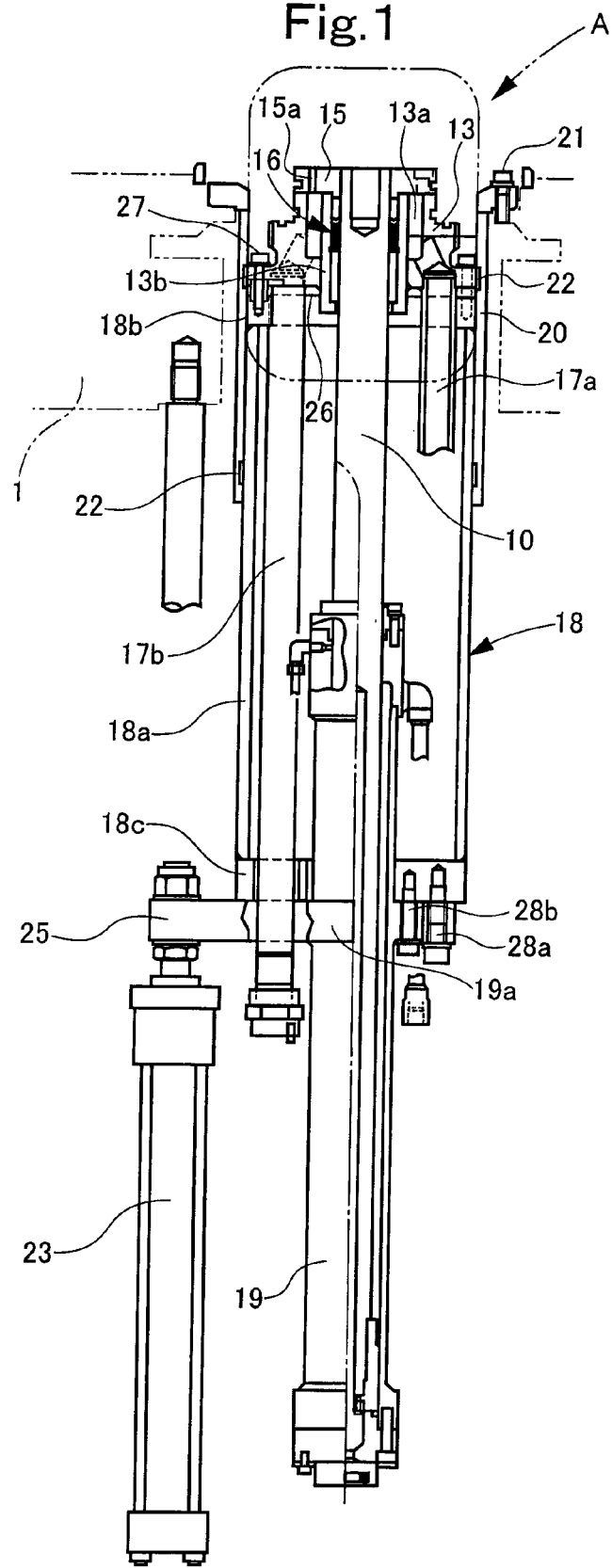
FIG. 1 is a sectional view of essential parts of a center mechanism of a tire vulcanizing machine, showing an embodiment of the present invention.
Figure 2:
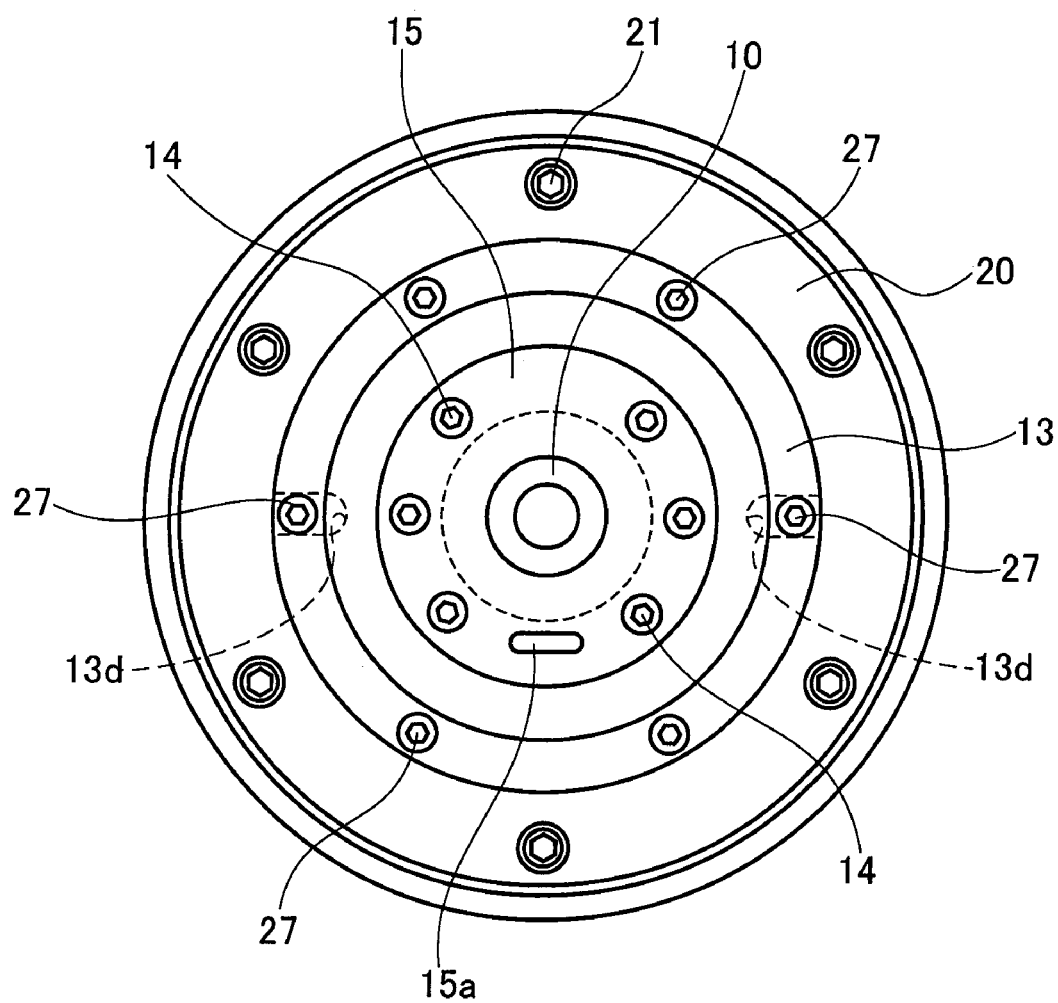
FIG. 2 is a plan view of FIG. 1.
Figure 3:
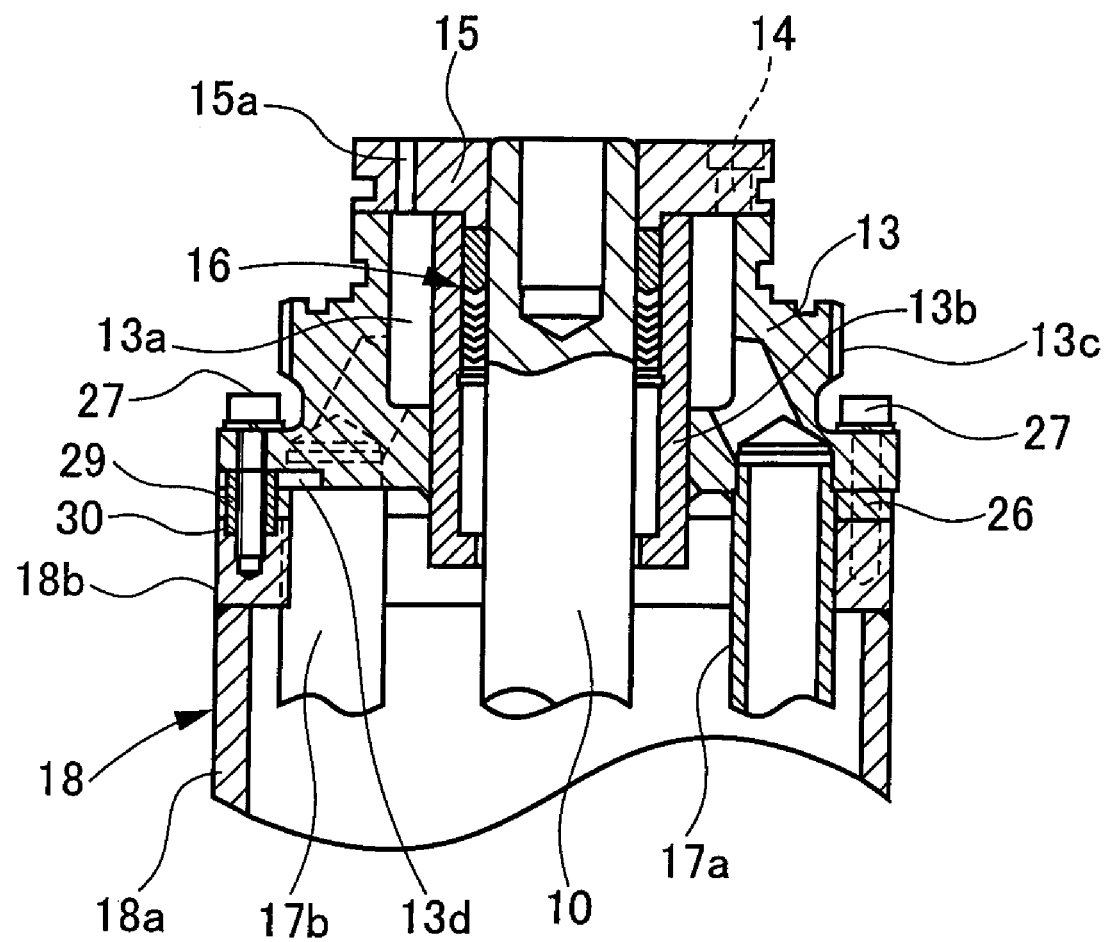
FIG. 3 is an enlarged sectional view of a part A in FIG. 1.
Figure 4:
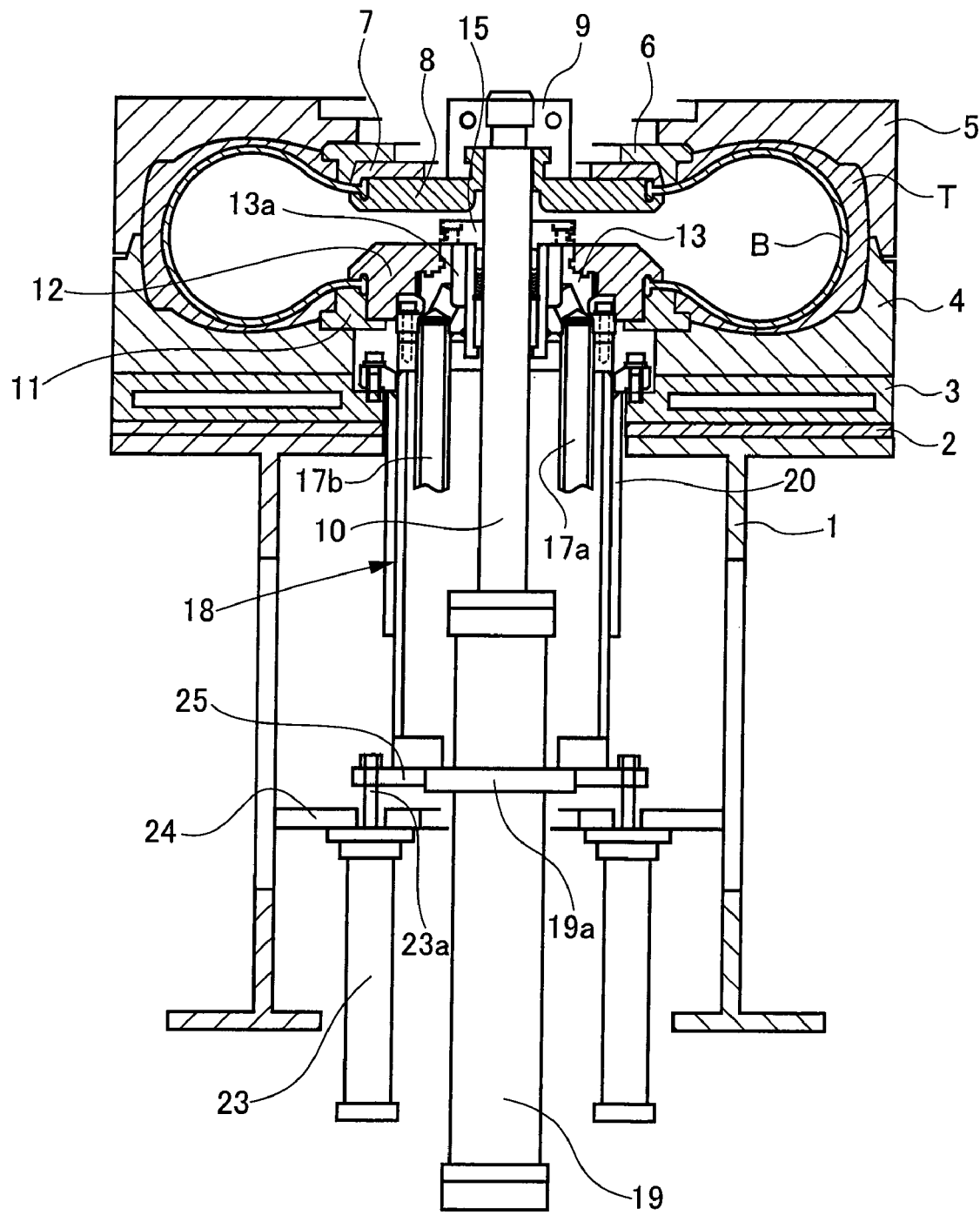
FIG. 4 is a sectional view of the center mechanism of the tire vulcanizing machine.
Figure 5:
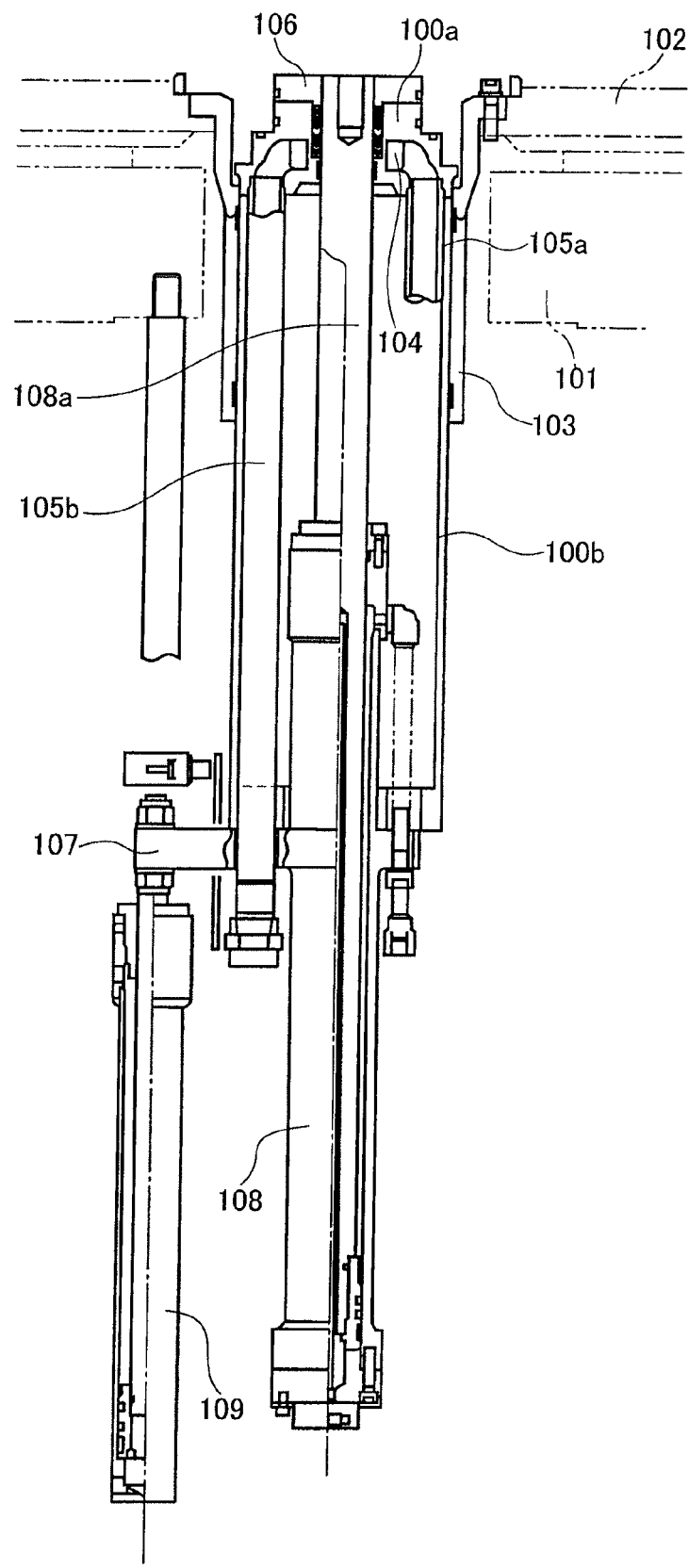
FIG. 5 is a sectional view of essential parts of a center mechanism of a tire vulcanizing machine according an earlier technology.

FIG. 1 is a sectional view of essential parts of the center mechanism of the tire vulcanizing machine, showing an embodiment of the present invention. FIG. 2 is a plan view of FIG. 1. FIG. 3 is an enlarged sectional view of a part A in FIG. 1. FIG. 4 is a sectional view of the center mechanism of the tire vulcanizing machine.

FIG. 4 shows a tire T being vulcanized, and a bladder B. A base of a body frame of a tire vulcanizing machine is indicated at 1. A lower heating platen 3 is fixed to the base 1 by bolts or the like via a heat insulating plate 2. A lower mold 4 is fixed to the lower heating platen 3 by bolts or the like. An upper mold 5 is fixed to a bolster plate (not shown), which has been assembled in an ascendable and descendable manner to the body frame, by bolts or the like via a heat insulating plate and an upper heating platen (not shown). An upper bead ring 6 is bolted to the upper mold 5.

An upper clamp ring 8 is adapted to hold an upper opening end part of the bladder B, and a clamp plate 7 is bolted to the upper clamp ring 8, whereby the upper opening end part of the bladder B can be grasped. A lock ring 9 is bisected in a circumferential direction, and a center post (a piston rod of a cylinder 19 for extending and retracting of the center post) 10 has an upper end part integrated with the bisected lock ring 9 by bolting together with the upper clamp ring 8 being inserted. In this manner, the upper clamp ring 8 is fixed to the upper end part of the center post 10. A sealing member is interposed between the center post 10 and the upper clamp ring 8.

In FIGS. 1, 2 and 4, a lower clamp ring 12 is adapted to hold a lower opening end part of the bladder B, and a lower bead ring 11 is bolted to the lower clamp ring 12, whereby the lower opening end part of the bladder B can be grasped. A hub (lower ring) 13 has an outer peripheral part to which the lower clamp ring 12 is fixed by screwing. A sealing member is interposed between the hub 13 and the lower clamp ring 12.

An assembly 16 of a sealing member and a bushing is inserted into an inner peripheral part of the hub 13 via a cylindrical case 13b, and is held in place by a circulation head 15 fastened to the hub 13 by a plurality of (six in the illustrated embodiment) bolts 14. Inwardly of the assembly 16 of the sealing member and the bushing, the above-mentioned center post 10 is fitted to be ascendable and descendable. The cylindrical case 13b is integrated with the inner peripheral part of the hub 13 by welding. An upper end part of a heating and pressurizing media passage 13a provided within the hub 13 opens into the bladder B via a nozzle hole 15a provided in the circulation head 15. A lower end part of the heating and pressurizing media passage 13a is connected to a heating and pressurizing media supply and discharge device (not shown) via a heating and pressuring media supply pipe 17a and a heating and pressuring media discharge pipe 17b fixed thereto by screwing-in or the like.

A cylindrical spacer 18 having a structure to be described later is integrated with the hub 13. The center post drive cylinder 19 has a flange 19a provided in a vertically intermediate part of the cylinder 19, and the flange 19a is bolted to a bottom wall portion 18c of the spacer 18. The center post drive cylinder 19 is actuated to extend or retract the aforementioned center post (the piston rod of the center post drive cylinder 19) 10, thereby expanding or contracting the bladder B in the vertical direction.

A guide tube 20 is fastened to an inner peripheral part of the lower heating platen 3 by a plurality of (six in the illustrated embodiment) bolts 21. The hub 13 moving integrally with the spacer 18 is fitted, in an ascendable and descendable manner, inwardly of a bushing 22 inserted into and fixed to the inner periphery of the guide tube 20. Bead lift cylinders 23 are bolted to brackets 24 fixed to the base 1, and upper end parts of piston rods 23a of the bead lift cylinders 23 are connected to a flange 25 of the above spacer 18. The bead lift cylinders 23 are actuated to raise or lower the center post drive cylinder 19, the spacer 18, the hub 13, the lower bead ring 11, and the lower clamp ring 12.

As shown in FIG. 3, the aforementioned hub 13 and the cylindrical spacer 18, both made of stainless steel or the like, are bound together by a plurality of (six in the illustrated embodiment) bolts 27 via a heat insulating material 26 in the form of a ring plate.

The spacer 18 has a cylindrical body portion 18a to whose upper end part an inward flange portion 18b larger in thickness than the cylindrical body portion 18a is welded for integration, and the above-mentioned bolts 27 are screwed into the inward flange portion 18b. A bottom wall portion 18c larger in thickness than the cylindrical body portion 18a is also integrated with a lower end part of the cylindrical body portion 18a by welding. The bottom wall portion 18c is connected to the aforementioned flange 25 and the flange 19a of the center post drive cylinder 19 by bolts 28a and 28b, respectively (see FIG. 1).

Between the hub 13 and the spacer 18, two whirl-prevention pins (whirl-prevention means) 29 are interposed at positions in point symmetry while penetrating the heat insulating material 26. In the illustrated embodiment, two slots 13d elongated in the radial direction are formed in the lower surface of the hub 13 around the holes through which the above-mentioned predetermined two bolts 27 are inserted (see FIG. 2). In the upper surface of the inward flange portion 18b as well, two shallow holes 30 are formed to be located around the threaded holes, into which the above two bolts 27 are screwed, and concentrically with the threaded holes. The whirl-prevention pins 29 of a cylindrical shape penetrating the heat insulating material 26 engage both with the slots 13d and the shallow holes 30 while being penetrated by the above-mentioned bolts 27. In FIG. 3, a threaded portion 13c allows the lower clamp ring 12 to be screwed thereon.

Before vulcanization of the tire T in the apparatus of the above-described configuration, the hub 13 and the spacer 18 descend, together with the center post cylinder 19, by the retracting action of the bead lift cylinder 23, whereby the unvulcanized tire T is positioned in the lower mold 4. Also, the leading end of the center post (piston rod) 10 protruding above the hub 13 is retracted by the center post cylinder 19, so that the bladder B grasped by the lower clamp ring 12 and the upper clamp ring 8 is inserted along the inner surface of the unvulcanized tire T set within the upper and lower molds 5 and 4.

In this state, a heating and pressurizing media are fed from the heating and pressurizing media supply and discharge device (not shown) via the following route, heating and pressurizing media supply pipe 17a→heating and pressurizing media passage 13a→nozzle hole 15a of circulation head 15, and supplied into the bladder B, whereby the tire is vulcanized at a high temperature, for example, close to 200° C.

After the vulcanization of the tire T is completed, the heating and pressurizing medium inside of the tire T is discharged, and then the upper mold 5 is raised. Then, the inside of the bladder B is vacuumed, and the center post drive cylinder 19 is operated to be extended, thereby raising the upper clamp ring 8. Thus, the bladder B is collapsed in diameter and extended upward, and is stripped from the tire T. Then, the bead lift cylinder 23 is operated to be extended, thereby raising the lower bead ring 11 to push up and strip the tire T from the lower mold 4. Whereafter the tire T is taken out of the apparatus by a publicly known means. Then, a tire T to be vulcanized next is brought in.

Then, the brought-in tire T is shaped, and the upper mold 5 is lowered. Upon closure of the mold, the heating and pressurizing media are fed into the tire T via the bladder B, as described above, to carry out the vulcanization step.

In the present embodiment, as stated above, the center mechanism is of a segmented structure in which the hub 13 and the spacer 18 are formed as the separate members and bound together by the bolts 27. Thus, a decrease in the number of the processing steps and an improvement in the quality can be achieved, because of abolition of welding or the like strongly affecting the quality. Also, the commonality of the components can be achieved (with the vulcanizing machine having two of the molds and two of the center mechanism arranged at the left and right sides, for example, it does not matter which of the right side and the left side the hub 13 and the spacer 18 should be located on).

The heat insulating material 26 is interposed between the hub 13 and the spacer 18. Thus, the heat during vulcanization at a high temperature, for example, close to 200° C. is restrained from being transferred from the hub 13 to the spacer 18, whereby the energy loss is curtailed. Moreover, thermal adverse influence on the center post drive cylinder 19 and the bead lift cylinder 23 upon heating is avoided. On the other hand, the temperature fall of the lower bead ring 11 screwed to the threaded portion 13c of the hub 13 can be suppressed, and the quality of the tire is improved.

The hub 13 and the spacer 18 are bound together by the bolts 27. Thus, during the disassembly and repair, replacement, etc. of the hub 13 due to wear or the like of the threaded portion 13c upon mounting and dismounting of the lower clamp ring 12, when the hub 13 is to be dismounted, for example, it suffices to loosen the bolts 27 and pull out the hub 13 upward. In comparison with the conventional structure requiring turning the hub 13 due to screw thread connection system, the dismounting operation is simplified, and enormous time and labor are unnecessary. For the mounting of the hub 13, only the reverse of the above-mentioned action is sufficient. The mounting operation is simplified, and enormous time and labor are unnecessary.

With the conventional structure requiring turning the hub 13 due to screw thread connection system, the lower end parts of the heating and pressurizing media supply pipe 17a and the heating and pressurizing media discharge pipe 17b connected to the hub 13 penetrate the bottom wall portion 18c of the spacer 18 and the flange 25. This makes it impossible to helically turn the hub 13 alone. In dismounting the hub 13, for example, the hub 13 and the spacer 18 in the interconnected state have to be disassembled from the base 1 and, in this state, the heating and pressurizing media supply pipe 17a and the heating and pressurizing media discharge pipe 17b have to be detached, whereafter the hub 13 must be helically turned and removed from the spacer 18. In the present embodiment, by contrast, the hub 13 can be easily pulled out upward, together with the heating and pressurizing media supply pipe 17a and the heating and pressurizing media discharge pipe 17b, with the spacer 18 being assembled to the base 1.

The whirl-prevention pins 29 engaging both with the hub 13 and the spacer 18 are installed. Thus, when the lower clamp ring 12 screwed to the threaded portion 13c of the hub 13 is to be mounted or removed by helical turning in order to change the size of the tire T, for example, the turning of the hub 13 can be reliably prevented by the whirl-prevention pins 29. Its turning moment acting on the bolts 27 to damage the bolts 27, for example, can also be prevented.

It goes without saying that the present invention is not limited to the above embodiment, and various changes and modifications may be made without departing from the gist of the invention. For example, the number of the bolts 27 binding the hub 13 and the spacer 18 can be changed, or the spacer 18 composed of the cylindrical body portion 18a, the inward flange portion 18b and the bottom wall portion 18c can be integrally formed. Furthermore, keys may be used instead of the whirl-prevention pins 29. Besides, the center post 10 may be formed as a member separate from the center post drive cylinder 19, and may be coupled to the piston rod of the cylinder 19.

INDUSTRIAL APPLICABILITY

The center mechanism of the tire vulcanizing machine according to the present invention ensures commonality of the components. Thus, it is preferred when used in a multiple vulcanizing apparatus comprising a plurality of molds and center mechanisms arranged side by side.

REFERENCE SIGNS LIST

1 Base
2 Heat insulating plate
3 Lower heating platen
4 Lower mold
5 Upper mold
6 Upper bead ring
7 Clamp plate
8 Upper clamp ring
9 Lock ring
10 Center post
11 Lower bead ring
12 Lower clamp ring
13 Hub
13a Heating and pressurizing media passage
13b Cylindrical case
13c Threaded portion
13d Slot
14 Bolt
15 Circulation head
15a Nozzle hole
16 Assembly of sealing member and bushing
17a Heating and pressurizing media supply pipe
17b Heating and pressurizing media discharge pipe
18 Spacer
18a Cylindrical body portion
18b Inward flange portion
18c Bottom wall portion
19 Center post drive cylinder
19a Flange
20 Guide tube
21 Bolt
22 Bushing
23 Bead lift cylinder
23a Piston rod
24 Bracket
25 Flange
26 Heat insulating material
27 Bolt
28a, 28b Bolt
29 Whirl-prevention pin
30 Shallow hole
B Bladder
T Tire

CITATION LIST

Patent Literature

Patent Document 1: Japanese Patent 3300744

The invention claimed is:

1. A center mechanism of a tire vulcanizing machine, including:
   an upper clamp ring for grasping an upper opening end part of a bladder,
   a lower clamp ring for grasping a lower opening end part of the bladder,
   a hub on a side of a lower mold for supporting the lower clamp ring,
   a cylindrical spacer connected to the hub and supported on the side of the lower mold to be ascendable and descendable, said spacer having a bottom wall portion which is penetrated by a heating and pressurizing medium supply pipe and a heating and pressurized medium discharge pipe,
   a center post drive cylinder supported by the bottom wall portion of the spacer and having an extensible and retractable post, and
   a whirl-prevention member provided between the hub and the spacer,
wherein the hub and the spacer are formed as members separate from each other, and are divisibly bound to each other by bolts.

2. A center mechanism of a tire vulcanizing machine, including:
   an upper clamp ring for grasping an upper opening end part of a bladder,
   a lower clamp ring for grasping a lower opening end part of the bladder,
   a hub on a side of a lower mold for supporting the lower clamp ring,
   a cylindrical spacer connected to the hub and supported on the side of the lower mold to be ascendable and descendable, said spacer having a bottom wall portion which is penetrated by a heating and pressurizing medium supply pipe and a heating and pressurized medium discharge pipe,
   a center post drive cylinder supported by the bottom wall portion of the spacer and having an extensible and retractable post,
   a heat insulating material interposed between the hub and the spacer, and wherein the hub and the spacer are formed as members separate from each other, and are divisibly bound to each other by bolts the center mechanism further comprising whirl-prevention means for preventing the hub from turning on the bolts.

* * * * *